United States Patent
Petite (12) 
(10) Patent No.: US 6,618,578 B1
(45) Date of Patent: Sep. 9, 2003

(54) SYSTEM AND METHOD FOR COMMUNICATING WITH A REMOTE COMMUNICATION UNIT VIA THE PUBLIC SWITCHED TELEPHONE NETWORK (PSTN)

(75) Inventor: Thomas D. Petite, Douglasville, GA (US)

(73) Assignee: Statsignal Systems, Inc, Atlanta, GA (US)

( * ) Notice: Subject to any disclaimer, the term of this patent is extended or adjusted under 35 U.S.C. 154(b) by 0 days.

(21) Appl. No.: 09/301,671

(22) Filed: Apr. 28, 1999

Related U.S. Application Data (63) Continuation-in-part of application No. 08/895,720, filed on Jul. 17, 1997, now Pat. No. 5,926,531, which is a continuation-in-part of application No. 08/825,576, filed on Mar. 31, 1997.

(60) Provisional application No. 60/040,316, filed on Feb. 14, 1997.

(51) Int. Cl.[7] ............................................. H04B 1/02
(52) U.S. Cl. ..................... 455/92; 455/411; 455/550; 455/557
(58) Field of Search ............................. 379/56.1, 56.2, 379/56.3, 7; 455/422, 411, 410, 41, 550, 90, 92, 95, 420, 88, 555, 556, 557

(56) References Cited

U.S. PATENT DOCUMENTS

| | | | | |
|---|---|---|---|---|
| 4,829,561 A | * | 5/1989 | Matheny | 379/56.3 |
| 4,849,815 A | | 7/1989 | Streck | 379/100 |
| 4,856,046 A | * | 8/1989 | Streck et al. | 379/56.3 |
| 5,231,658 A | * | 7/1993 | Eftechiou | 379/194 |
| 5,241,410 A | * | 8/1993 | Streck et al. | 379/56.3 |
| 5,272,747 A | | 12/1993 | Meads | 379/59 |
| 5,315,645 A | * | 5/1994 | Matheny | 379/144 |
| 5,522,089 A | | 5/1996 | Kikinis et al. | 395/893 |
| 5,757,788 A | | 5/1998 | Tatsumi et al. | 370/336 |
| 5,790,644 A | * | 8/1998 | Kikinis | 379/144 |
| 5,815,505 A | * | 9/1998 | Mills | 370/522 |
| 5,832,057 A | * | 11/1998 | Furman | 379/168 |
| 5,926,529 A | * | 7/1999 | Hache et al. | 379/7 |
| 5,926,531 A | * | 7/1999 | Petite | 379/144 |
| 5,995,592 A | * | 11/1999 | Shirai et al. | 455/566 |
| 5,995,593 A | * | 11/1999 | Cho | 455/90 |

OTHER PUBLICATIONS

Data Sheets, Ash Transceiver, Obtained from RF Monolithics, Inc.'s Web Page at http://www.rfm.com, pp. 1–8.

Data Sheets, Ash Transceiver Designer's Guide, Obtained from RF Monolithics, Inc.'s Web Page at http://www.rfm.com, pp. 1–53.

* cited by examiner

*Primary Examiner*—Edward F. Urban
*Assistant Examiner*—Sonny Trinh
(74) *Attorney, Agent, or Firm*—Thomas, Kayden, Horstemeyer & Risley (57) ABSTRACT

The present invention is generally directed to a system and method for communicating between a personal data access device and a remote communication unit. In accordance with one aspect of the invention, a device, electrically connected for communication with a public switched telephone network (PSTN), is provided for facilitating communications between a personal data access device and a remote communication unit disposed in communication with the PSTN. The device includes a radio frequency (RF) transceiver configured for communication with a remote RF transceiver associated with the personal data access device, via an RF link, and a controller, responsive to communications received from the remote RF transceiver to maintain two-way communication between the personal data access device and the remote communication unit via the PSTN and the RF link.

13 Claims, 6 Drawing Sheets

SYSTEM AND METHOD FOR COMMUNICATING WITH A REMOTE COMMUNICATION UNIT VIA THE PUBLIC SWITCHED TELEPHONE NETWORK (PSTN)

CROSS-REFERENCE TO RELATED APPLICATIONS

This application is a continuation-in-part of U.S. patent application Ser. No. 08/895,720, filed on Jul. 17, 1997 now U.S. Pat. No. 5,926,531, and entitled Transmitter for Accessing Pay-Type Telephones, hereby incorporated by reference, which is a continuation-in-part of U.S. patent application Ser. No. 08/825,576, filed on Mar. 31, 1997, and entitled Transmitter for Accessing Automated Financial Transaction Machines, which claims the benefit of U.S. provisional patent application Serial No. 60/040,316, filed Feb. 14, 1997, and entitled Card Replacement Transceiver For Use With Automatic Teller Machines.

BACKGROUND OF THE INVENTION

1. Field of the Invention

The present invention generally relates to communication systems, and more particularly to a system and method for communicating with a remote communication unit via the public switched telephone network (PSTN).

2. Discussion of the Related Art

In recent years, there has been tremendous growth in the telecommunications industry. This growth has been fueled, in large part, by the proliferation of the Internet. More particularly, one segment of the telecommunications industry relates to data communications. As is known, data communications relates to the communication of data (as opposed to voice) from one end point to another. Typically, some type of computer or computing device is located at each end point, each having a communication device (such as a modem) to carry out the necessary modulation and demodulation of the signal that is communicated between the two end points.

A typical system configuration includes two computers, or computing devices, remotely located, but configured to inter-communicate over the PSTN. As one example, such a system exists when communicating between a first computer located at a residential customer premises and a second computer located at, for example, a service provider. In a manner that is well known, the first computer may initiate the connection by instituting a dial-up procedure, whereby it establishes a connection across the PSTN to make second computer located at, for example, a service provider location. Once the connection is established, data communications may be freely exchanged between the first computer and the second computer, over the PSTN.

Remote computing devices, such as laptop computers, electronic schedulers, palm-corders, and other similar devices (also referred to herein as personal access devices) can be similarly configured for communication with a remote computing device. In one configuration, a jack or I/O port may be provided on the personal access device to allow a direct electrical connection (via cable) between the personal access device and, for example, and RJ-11 phone jack. However, in many situations phone jacks are not readily available. Therefore, an alternative means for communicating between two remote computing devices is desired.

Figure 1:
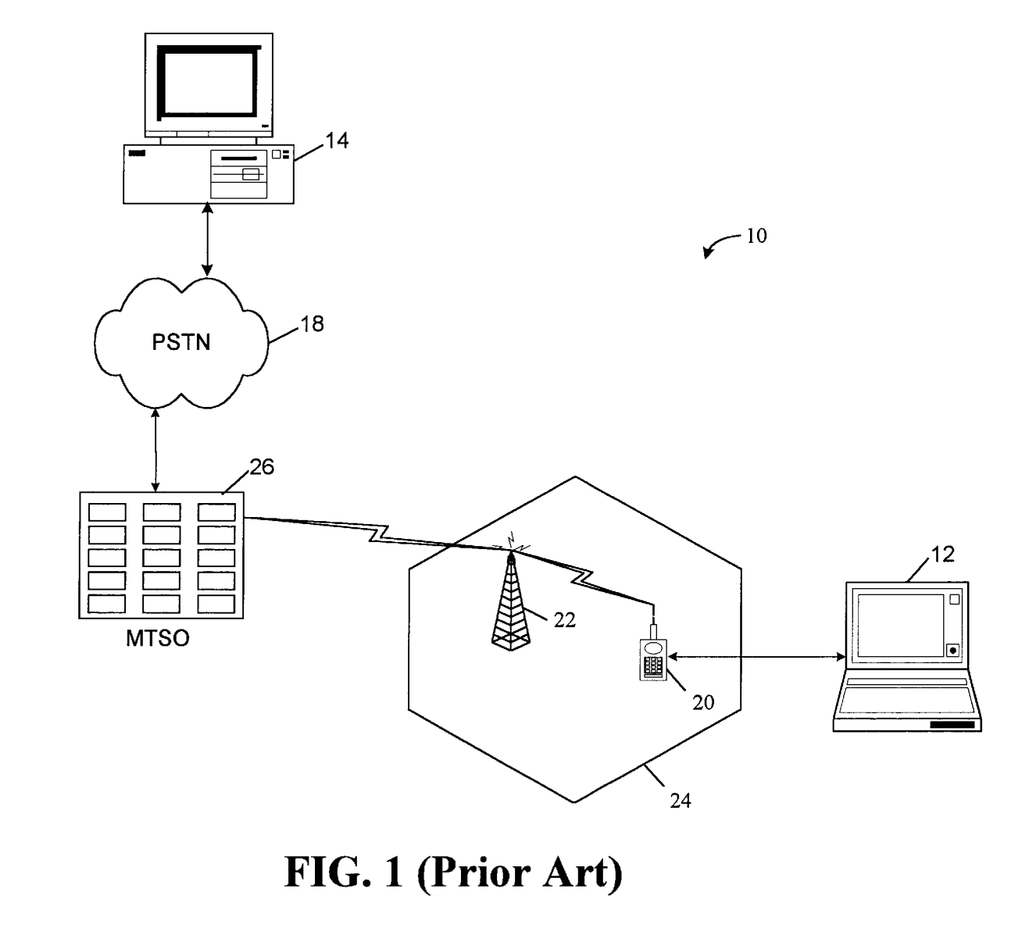
FIG. 1 is a diagram illustrating a prior art system in which a laptop computer is disposed for communication with a remote communication unit via a cellular link and a PSTN link.

Cellular systems are known to provide one such configuration. Referring to FIG. 1, the system 10, as is known in the prior art, illustrates the data communications connection between the laptop computer 12 and a remote computing unit 14. The communication path established between laptop computer 12 and a remote computing unit 14 includes a cellular link 16 and a PSTN link 18. As is known, electrical hookups may be provided to electrically connect the computer 12 to a cellular phone 20. This "hookup" in part includes a cellular modem (not shown) within the computer 12. This cellular modem may communicate with this cellular phone 20 via a direct electrical connection. The cellular phone 20, in turn, communicates via electromagnetic waves to a nearby cell site 22 (located within the cell 24). The cell site 22 then relays this information to a mobile telephone switching office (MTSO) 26. In a manner that is known, the MTSO 26 may be disposed for communication with other cell sites (not shown), as well as the PSTN 18. Therefore, information may be communicated from the laptop computer 12 to the remote 10 computing device 14 by way of cellular telephone 20, cell site 22, MTSO 26, and the PSTN 18.

The communication system 10 illustrated in FIG. 1 provides one configuration for communicating data between a transitory computing device (laptop 12) and a remote computing unit 14, it has several drawbacks. First, the communication channel established in a cellular link is inherently noisy and, therefore, unreliable. As a result, many errors can occur, leading to retransmissions of data, which slow down the effective communication link. In addition, most cellular service providers charge a relatively substantial fee for cellular phone usage. Therefore, a person is generally billed for each minute that they are communicating across the cellular phone 20.

Accordingly, an alternative configuration is desired that overcomes the shortcomings noted above.

SUMMARY OF THE INVENTION

Certain objects, advantages and novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the advantages and novel features, the present invention is generally directed to a system and method for communicating between a personal data access device and a remote communication unit. In accordance with one aspect of the invention, a device, electrically connected for communication with a public switched telephone network (PSTN), is provided for facilitating communications between a personal data access device and a remote communication unit disposed in communication with the PSTN. The device includes a radio frequency (RF) transceiver configured for communication with a remote RF transceiver associated with the personal data access device, via an RF link, and a controller, responsive to communications received from the remote RF transceiver to maintain two-way communication between the personal data access device and the remote communication unit via the PSTN and the RF link.

In accordance with another aspect of the present invention, a method is provide for establishing and maintaining a communication link between a remote communication unit that is in direct electrical communication with a public switched telephone network (PSTN) and a remote access device that is electrically remote from the PSTN. In accordance with this aspect of the invention, the method includes the steps of receiving a request to establish a connection with the remote communication unit, the request being sent via electromagnetic waves from a nearby personal access device and establishing a communication link via the PSTN between the communication device and the remote communication unit. The method further includes the step of relaying communications from the remote communication unit to the communication device along to the personal data access unit, via electromagnetic waves. The method further includes the step of relaying communications from the personal data access unit to the communication device along to the remote communication unit.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Having summarized the present invention above, reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

Figure 2:
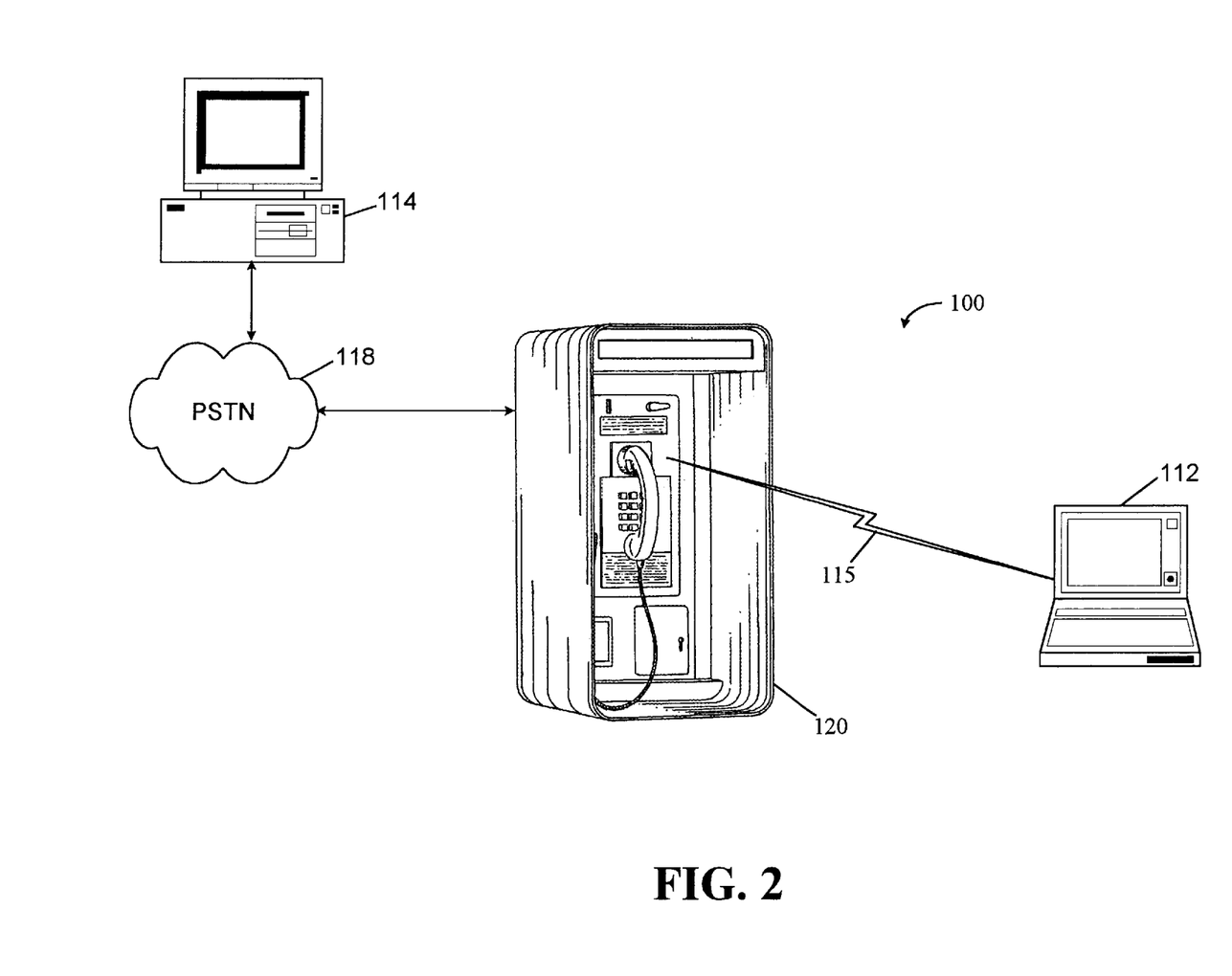
FIG. 2 is a diagram illustrating a system constructed in accordance with the present invention, wherein a computer is disposed for communication with a remote communication unit via an RF link and a PSTN link.

Reference is now made to FIG. 2, which is a diagram that illustrates a communication system 100 constructed in accordance with the present invention. In short, the present invention provides an alternative system and method for communicating between a personal data access device, such as a laptop computer 112, and a remote computing unit 114. In accordance with the invention, a communication link between the remote computing unit 114 and the personal data access device 112 is substantially across the PSTN 118. However, to accommodate the flexibility and remote nature of the personal data access device 112, a short segment of the communication link is established through electromagnetic waves, preferably in the form of a radio frequency (RF) link 115. A communication device 120—a public pay-type telephone in the illustrated embodiment —provides for the translation and intercommunication between the PSTN 118 and the RF link 115.

It should be appreciated from the discussion herein, that the communication device 120 may be provided in forms other than a public telephone. Indeed, communication devices may be provided in "nodes" that are disposed for communication with the PSTN 118, and which are inaccessible (hidden from view) from the general public. Nevertheless, they may be configured so that they may receive electromagnetic waves transmitted from a nearby personal data access device, in order to establish and maintain communications with a remote computing unit 114, in accordance with the present invention.

It should be appreciated that the personal data access device 112 may be any of a wide variety of devices, including but not limited to a desktop computer, a laptop computer, a palm-corder, or any of a number of hand-held computing devices. As is known there are many hand-held computing devices, like schedulers and organizers, that have communication capability. Devices such as these may be modified to include an RF transceiver and other necessary components to operate in accordance with the present invention.

In operation, a user of the personal data access device 112 may use the device 112 in accordance with its ordinary functionality (e.g., computing, scheduling, etc.). When, however, it is desired to access and inter-communicate with a remote computing device 114, the personal data access device 112 may be readily configured to establish this communication. Indeed, in one embodiment, a personal data access device 112 may be configured, consistent with prior art devices, to establish communication with a remote computing unit 114 through a direct PSTN connection. In this regard, the device 112 will be connected to, for example, a phone jack via a direct cable connection.

If, however, a direct cable connection is not a viable option (i.e., the user of the personal data access device 112 is not near an accessible phone jack), then an alternative means of communication between the device 112 and the remote computing unit 114 may be established and maintained in accordance with the present invention. By way of illustration, consider a person waiting on a flight in an airport wishing to check his or her e-mail messages, by dialing into a server at his or her place of employment, or an Internet service provider. In accordance with the present invention, the person may simply use the device 112 to initiate a dialout procedure via an RF link 115 through a nearby communication device 120. It is assumed, for purposes of this illustration, that the nearby communication device 120 incorporates a transceiver and other circuitry (discussed in connection with FIG. 3) in accordance with the present invention.

Thus, it will be appreciated that the telephone 120 of the present invention will include internal circuitry that is not presently a part of standard telephone circuitry. In this regard, reference is made to FIG. 3, which is a block diagram illustrating the basic components of this circuitry inside telephone 120. In the illustrated embodiment, the telephone 120 includes a RF transceiver 122, an interface circuit 124, telephone circuitry 126, a handset 128, and a controller 130. The block denoted as "telephone circuitry" 126 should be understood as comprising components that are contained within standard telephones. Specifically, a typical telephone will include an interface circuit 124, telephone circuitry 126, and handset 128. The interface circuit 124 refers to the line driver and other interface circuitry that interfaces a telephone with the two wire pair of the local loop.

Figure 3:
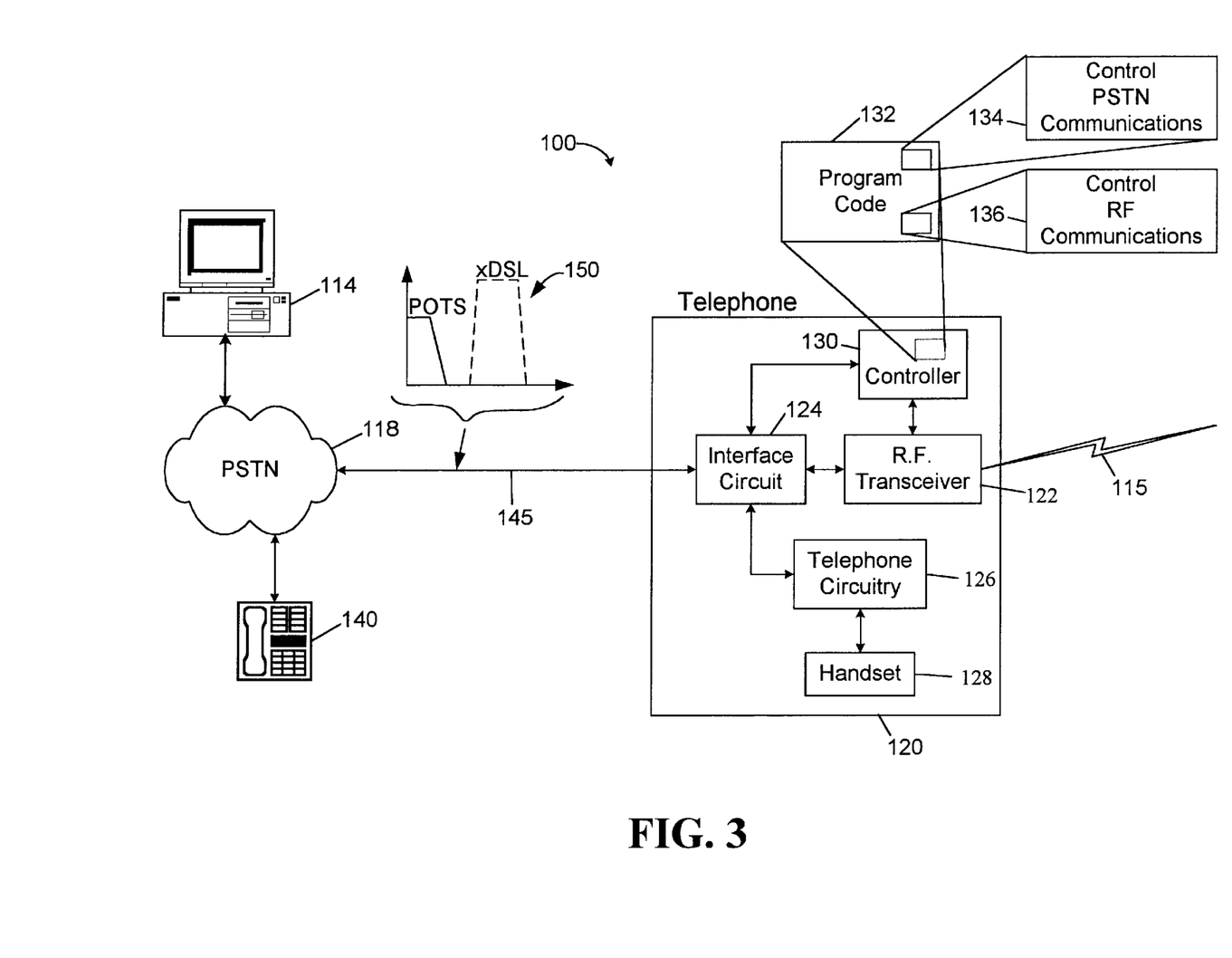
FIG. 3 is a block diagram illustrating certain components within a communication device (e.g., a telephone), in accordance with one embodiment of the present invention.

In accordance with the present invention, additional circuitry, including a transceiver 122 and a controller 130 are integrated within the telephone 120. It should be appreciated that, in accordance with concepts and teachings of the present invention, the transceiver 122 need not be a RF transceiver, but could employ other technologies as well, such as infrared, ultrasonic, etc. However, in accordance with the preferred embodiment a RF transceiver 122 was selected. Indeed, in accordance with the preferred embodiment of the present invention a 900 MHz RF transceiver 122 was selected. In recent years, many cordless telephones have begun using 900 MHz RF transmission, which has been found to deliver better noise immunity in short distance RF communication. The classification of 900 MHz is rather loosely used, as precise communication frequencies typically vary slightly. The specific RF transceiver of the preferred embodiment may be the TR1000, manufactured by RF Monolithics, Inc.

As is known, the TR1000 hybrid transceiver is well suited for short range, wireless data applications where robust operation, small size, low power consumption, and low-cost are desired. All critical RF functions are contained within the single hybrid chip, simplifying circuit design and accelerating the design-in process. The receiver section of the TR1000 is sensitive and stable. A wide dynamic range log detector, in combination with digital automatic gain control (AGC) provide robust performance in the presence of channel noise or interference. Two stages of surface acoustic wave (SAW) filtering provides excellent receiver out-of-band rejection. The transmitter includes provisions for both on-off keyed (OOK) and amplitude-shift key (ASK) modulation. The transmitter employs SAW filtering to suppress output harmonics, for compliance with FCC and other regulations.

Additional details of the TR1000 transceiver need not be described herein, because the present invention is not limited by the particular choice of transceiver. Indeed, numerous transceivers may be implemented in accordance with the teachings of the present invention. Such other transceivers may include other 900 MHz transceivers, as well as transceivers at other RF frequencies. In addition, infrared, ultrasonic, and other types of transceivers may be employed, consistent with the broad scope of the present invention. Further details of the TR1000 transceiver may be obtained through data sheets, application nodes, design guides (e.g., the "ASH Transceiver Designers Guide"), and other documentation which are published and known by persons in the art.

In keeping with the description of FIG. 3, the telephone 120 also includes a controller 130. The controller 130, as illustrated, is disposed for communication with the interface circuit 124 as well as the transceiver 122. The controller 130 may be provided in a variety of forms. For example, the controller may be provided through dedicated circuitry. Alternatively, the controller 130 may be implemented through more general-purpose circuitry, which may include a CPU (not shown) and a memory (not shown). In a manner that should be appreciated, the memory may store program code 132 that includes a series of instructions that may be executed by the CPU. In accordance with the inventive aspects, portions of the program code may include a first segment 134 that is configured to control communications between the telephone 120 and a remote communication unit 114 over the PSTN 118. A second segment 136 may be configured to control RF communication between the telephone 120 and personal data access device 112 over of the RF link 115.

It should be appreciated that persons having ordinary skill in the art (an electrical circuit designer) will readily appreciate how the controller 130 may be implemented, without requiring undue experimentation. Indeed, the specific implementation of the controller 130 will necessarily vary depending upon the specific transceiver 122 and the details of the interface circuit 124. What is significant for purposes of the present invention is that the controller 130 is designed to control the operation of the RF transceiver 122, so that the transceiver 122 effectively communicates with the personal data access device 112. Likewise, the controller 130 controls the interface circuit 124 so that the interface circuit may effectively communicate, via the PSTN 118, with a remote communication unit 114.

In accordance with the broader aspects of the present invention, various embodiments of the controller 130, and system 100, may be implemented. In one embodiment, the system 100 may be designed so that all communications between the telephone 120 and the remote communication unit 114, via the PSTN 118, take place within the POTS (plain old telephone system) frequency band, which extends between approximately 0–4 kHz. In such an embodiment, if a person is using the telephone 120 in its ordinary fashion (i.e., by talking over the handset), then the controller 130 will be configured to prevent another person from establishing a connection, via the RF link 115, with the PSTN 118. Likewise, if a person has established a connection with a remote communication unit 114 via the PSTN 118 and RF link 115, then the controller is configured to prevent a person from disrupting this communication link by lifting the handset 128 and attempting to dial out, or otherwise. In one embodiment, once a communication link between the remote communication unit 114 and personal data access device 112 has been established, a person lifting the handset 128 to place a telephone call will simply here a "dead" line, indicating that telephone is unavailable for current use. In alternative embodiment, the controller 130 may be interfaced with the telephone circuitry 126 to provide, for example, a recording, so that the person lifting the handset may hear a recorded message that the line is currently in use, and that they should try again later. Such a configuration may be preferred, because such a recording would prevent a person from confusing a "dead" line as indicating that the telephone 120 is out of order.

In accordance with an alternative configuration of the present invention, the system 100 may be configured to allow simultaneous communication with multiple remote units. In one such configuration, the POTS frequency band may be dedicated for conventional voice communication between the handset 128 and a remote telephone 140. An alternative service, such as DSL (digital subscriber line), ISDN (integrated services digital network), or other, may be implemented to handle data communications. As is known, and illustrated by reference 150, DSL communications occur in a frequency band that is above the POTS frequency band. Therefore, the controller 130 and interface circuit 124 may be configured to allow simultaneous voice and data communications over the same two wire pair local loop 145 to two separate remote destinations, without signal interference. In such an embodiment, data communicated between the personal data access device 112 and a remote communication unit 114 may be communicated over the PSTN between the central office (not shown) and a telephone 120 at a higher frequency range. Therefore, the data communications may take place between the personal data access device 112 and a remote communication unit 114 at the same time that voice communications may take place between the handset 128 and the remote telephone 140, sharing the same local loop 145.

Figure 4:
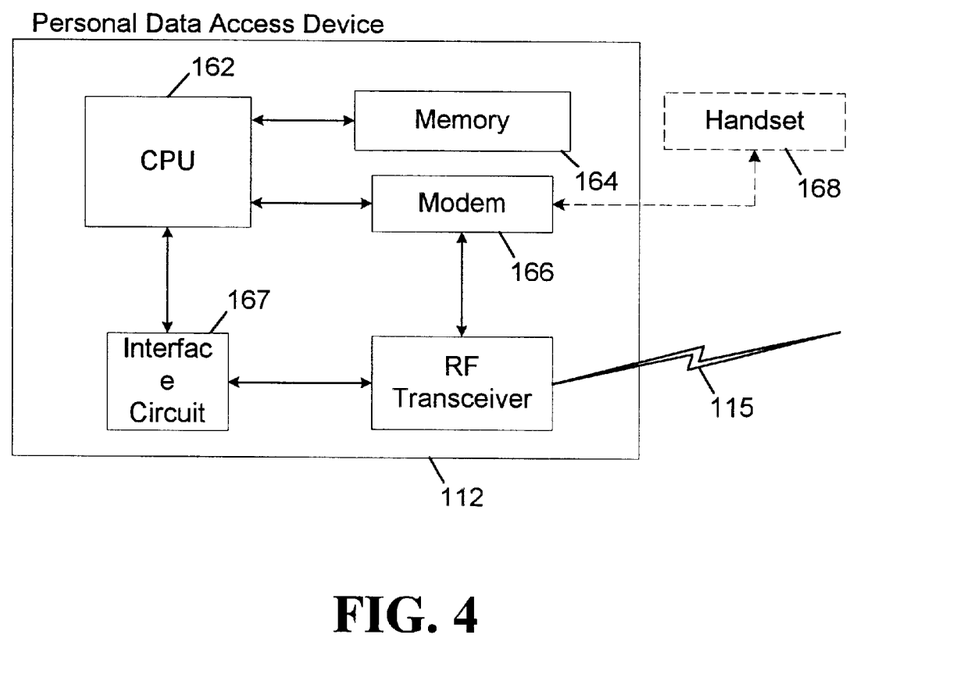
FIG. 4 is a block diagram illustrating certain components within a personal data access device (e.g., a laptop computer), in accordance with one embodiment of the present invention.

Reference is now made FIG. 4, which is a block diagram that illustrates the personal data access device 112 in accordance with one embodiment of the present invention. As previously described, the personal data access device 112 may be in the form of a personal computer, such as a laptop computer. As is known, a laptop computer includes a CPU 162, memory 164, as well as other circuitry or circuit cards that are utilized in the operation of the device 112. In accordance with the present invention, a transceiver 160 is also provided in order to establish and maintain communications with the transceiver 122 described in connection with FIG. 3. A modem 166 may also be provided for modulating the signal before delivering the signal to the RF transceiver 160. In some implementations, however, the modem 166 may be integrated as a part of the transceiver 160. Accordingly, although a variety of transceiver technologies may be employed, it will be appreciated that transceiver 160 will be compatible with the transceiver 122. An interface circuit 167 may also be provided and configured to interface the CPU 160 with the RF transceiver 160. Of course, the specific implementation of the interface circuit 167 will necessarily depend upon the specific transceiver 160 and CPU 162 that are implemented. Program code (not shown) stored within the memory 164 may be used to instruct the CPU 162, so as to control the operation of the RF transceiver 160.

In another embodiment, a handset 168 (illustrated in dash line) may be provided and coupled to the modem 166. Implementing simultaneous voice data (SVD) technology, the device 112 may communicate both voice and data information with a remote computing unit 114, through the communication path provided by the inventive system 100.

Figure 5:
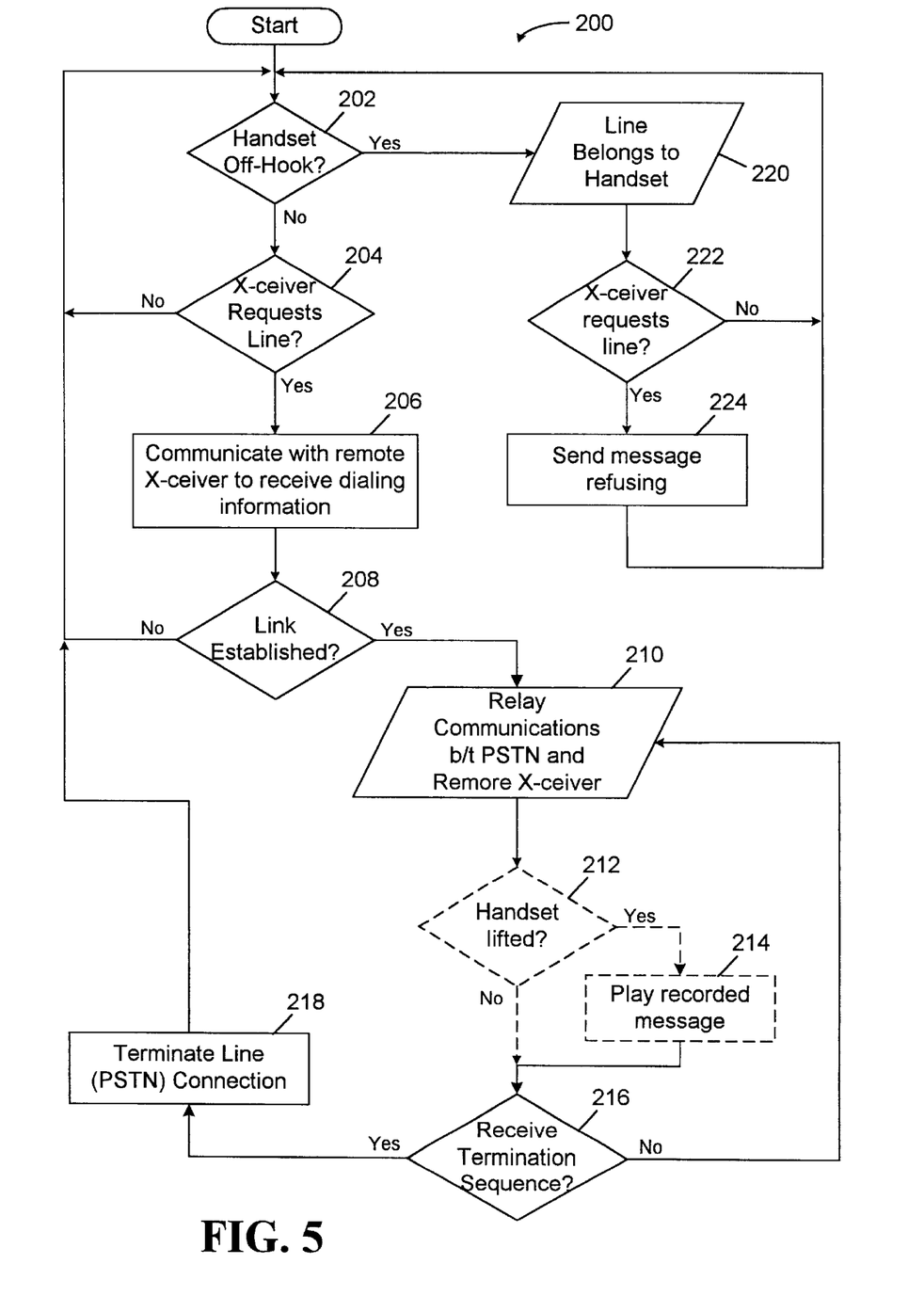
FIG. 5 is a flowchart illustrating the top-level functional operation of a communicating device constructed in accordance with one embodiment of the present invention.
Figure 6:
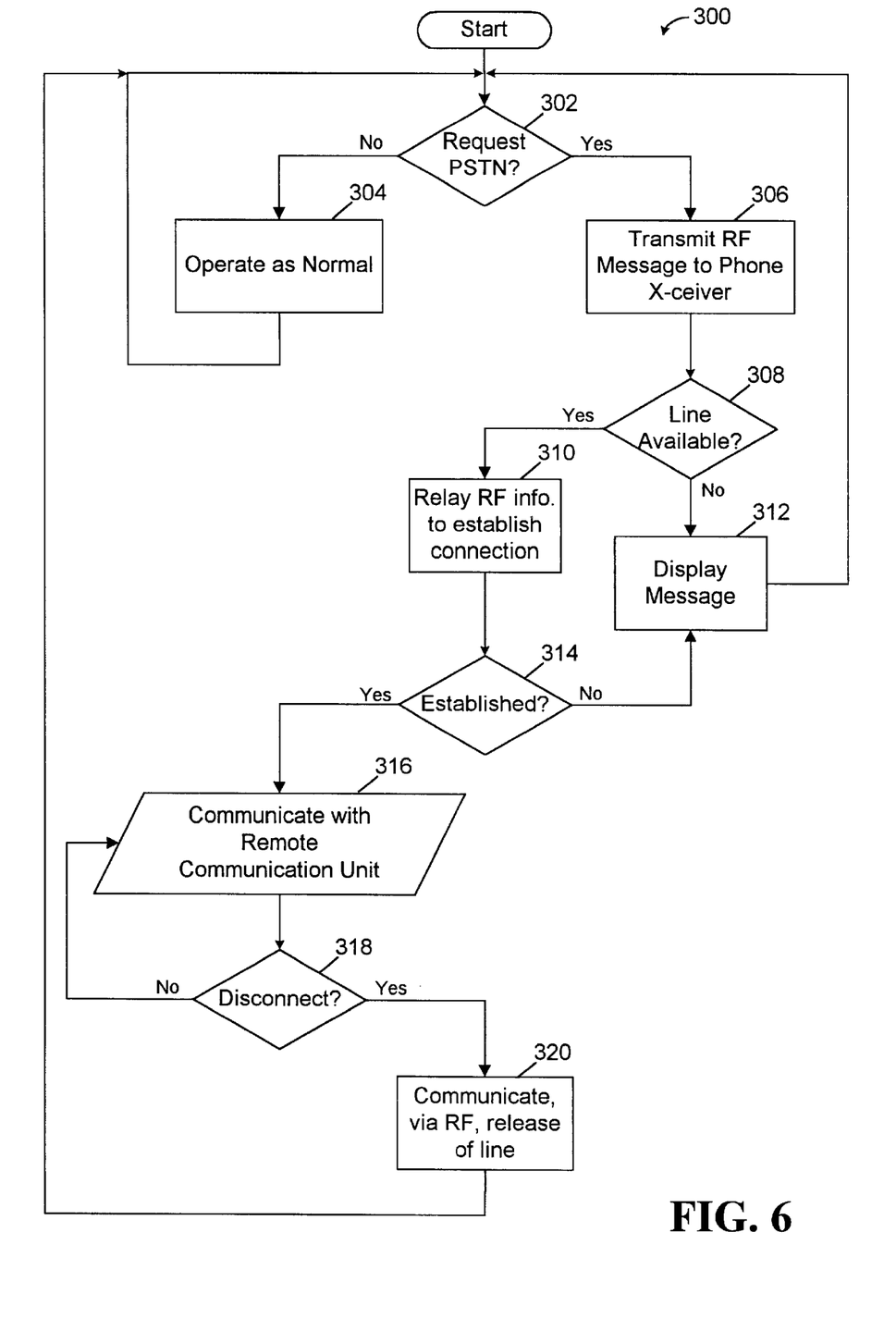
FIG. 6 is a flowchart illustrating the top-level functional operation of a personal data access device constructed in accordance with one embodiment of the present invention.

Having described the principal hardware components of a system 100 constructed in accordance with the invention, reference is now made to FIGS. 5 and 6, which are flowcharts that illustrate the top-level functional operation of a telephone 120 and a personal data access device 112, in accordance with one embodiment of the invention. Referring first to FIG. 5, a flowchart 200 illustrates the operation of a telephone 120 (or other communication device), constructed in accordance with one aspect of the present invention. As mentioned above, a system constructed in accordance with the invention may be implemented in various configurations. One configuration may allow simultaneous communication between a personal data access device 112 with a remote communication unit 114, and the telephone handset 128 with a remote telephone 140. In alternative configuration, such simultaneous communication is prohibited. A flowchart 200 of FIG. 5 illustrates the top-level operation of a system constructed in accordance with the alternative (i.e., no simultaneous communication) configuration.

After a power up reset, for example, the system may evaluate whether the telephone handset 128 is on hook or off hook (step 202). If the handset is off hook, then the controller 130 dedicates communications over the PSTN line 145 to the handset 128 (step 220). In one implementation, the controller 130 may check to determine whether the transceiver 122, in response to a request from the personal data access device 112, has requested communication over the PSTN (step 222). If so, the controller may control a reply message via the RF link 115 to the personal data access device 112, and forming the a personal data access device 112 that the line is busy, and therefore unavailable (step 224). Thereafter, the controller may loop back to step 202. So long as the handset 128 remains off hook, the PSTN communication link 145 will "belong" to the handset 128.

Once, however, the handset 128 is replaced and the telephone is no longer off hook, then the controller may check to determine whether the transceiver 122 has requested the PSTN communication link 145 (step 204). If not, the controller may loop on steps 202 and 204, until either the handset 128 is taken off hook or the transceiver 122 has requested the PSTN communication link 145. Once the transceiver 122 has requested communication over the PSTN link 145, then the controller controls communications between the transceiver 122 in the personal data access device 112 to retrieve initialization and start-up information. For example, the personal data access device 112 may communicate to the controller 130 the telephone number that is to be dialed in order to establish a communication link with a remote communication unit 114. The signaling that takes place in order to establish this link need not be described herein, as it should be appreciated by persons skilled in the art.

The controller may verify (step 208) that the communication link has been properly established. If not, the controller may return to step 202, and proceed as described above. If, however, the communication link has been properly established, then the controller will control the operation of the telephone 120 to relay communications between the PSTN 118 and the remote transceiver 160 of the personal data access device 112. In an embodiment that prohibits simultaneous communication between the device 112 and remote communication unit 114, and the handset 128 and a remote telephone 140, the controller 130 may be configured to check (during data communications) to determine whether the handset 128 is lifted (step 212). If so, the controller 130 may be configured to control the playback over the handset 128 of a recorded message (step 214). Such a message may inform the person lifting handset that the line is temporarily in use and that the person should try back again later. Such a feature helps to prevent confusion by the person as to whether the line may be dead, or telephone malfunctioning.

As the controller 130 operates to relay communications between the PSTN 118 the personal data access device 112, it may also check for a termination sequence (step 216). Specifically, the controller 130 may evaluate messages received from the personal data access device 112 for a particular sequence that would identify the desire on the part of the device 112 to terminate the connection with the remote communication unit 114. Of course, in the preferred embodiment, program code within the device 112 will communicate this desire to the remote communication unit 114 before issuing a termination sequence to the controller 130. Once such a termination sequence is received, the controller then controls the signaling to terminate the PSTN connection (step 218). Thereafter, the controller may return to step 202 and proceed as described above.

Reference is now made to FIG. 6, which is a flowchart 300 illustrating the top-level functional operation of the control aspect of one embodiment of the personal data access device 112. At a first step (step 302) the device 112 may determine whether it wishes to request communication with a remote device over the PSTN. If not, the device 112 may continue to operate in its normal, functional fashion (step 304). If, however, the PSTN communication connection is desired, then the device 112 will transmit, via electromagnetic waves, a certain signaling sequence (step 306) to the transceiver 122 integrated within the telephone 120, or other communication device. The device 112 may then check for a responsive message (sent from the communication device 120) to determine whether the line is available (step 308). As illustrated and FIG. 5, the controller 130 of the communication device 120 may send a reply message if the line is unavailable (step 224). If step 308 determines that the line is not available, or it receives no response at all (indicating that there is no nearby transceiver connected to the PSTN), then it may display an appropriate message to the user, and thereafter return to step 302. If, however, a line is available, then the device 112 relays or exchanges the necessary information, via electromagnetic waves, with the transceiver 122 of the communication device (step 310), in order for the controller 130 to establish a communication link.

The device 112 may then check to determine whether a communication link was properly established (step 314). If not, it may display an appropriate message to the user (step 312) and return to step 302. If, however, a proper communication link was established between the controller 130 and the remote communication unit 114, then the device 112 will proceed to communicate with the remote communication unit 114 via RF link 115 and the PSTN 118. This communication will continue until the device 112 seeks to terminate the connection. Therefore, the device 112 may evaluate whether it wishes to disconnect (step 318) the connection. If not, the flowchart 300 indicates that the device may simply loopback to step 316, where communication continues. If, however, the device 112 wishes to disconnect the communication link, then it communicates via electromagnetic waves appropriate disconnect signaling (step 320) to the controller 130 of the communication device 120. Thereafter, the device 112 may return to step 302, where it may proceed as previously described.

It should be appreciated that other implementation aspects and features will necessarily be implicated, although not described herein. For example, one such feature relates to billing information. As is known, public, pay type telephones typically require a user to deposit a small amount of money to make a local call, and additional money for long distance calls. This type of information (i.e., credit card information) could be communicated as part of the start-up sequence from the device 112 to the controller 130. This controller 130 may, subsequently, communicate this information to the central office (not shown) when establishing the PSTN communication link 145.

As also described above, in accordance with one configuration, a handset may be provided in connection with the personal data access device 112, whereby a user may be able to communicate voice information to a remote end point. It will be appreciated that a connection to the Internet may be made by dialing a phone number of a local service provider. Therefore, the billing required would be only the small amount required for placing a local phone call. However, using software and computer techniques that are now well known, a voice call may be placed (utilizing the Internet) to a very distant communication device (not shown), whereby (effectively) long distance telephone calling may be achieved for the price of only a local call. Teleconferencing systems are presently known and available for providing this type of voice teleconferencing over the Internet, in dedicated or stationary computing systems.

Accordingly, as described above a system is provided for communicating with a remote communication unit via a public switched telephone network (PSTN). In one embodiment, the system includes a personal data access device executing a program that is to communicate with the remote communication unit via the PSTN, a data communication device associated with the personal data access device and in communication with the program, and a first radio frequency (RF) transceiver associated with the personal data access device and in communication with the data communication device. The system further includes a public, pay-type telephone, electrically connected for communication over the PSTN, a second RF transceiver associated with the telephone, the second RF transceiver configured for communication, via an RF link, with the first RF transceiver, and a controller associated with the telephone, responsive to communications received from the first RF transceiver to seize a phone line, initiate, and establish a communication link over the PSTN to a remote communication link designated by the personal data access device, the controller and the program being further configured to maintain two-way communication between the personal data access device and the remote communication device via the PSTN and the RF link.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What is claimed is:

1. A system for communicating with a remote communication unit via a public switched telephone network (PSTN), comprising:

a personal data access device executing a program that is to communicate with the remote communication unit via the PSTN;

a first radio frequency (RF) transceiver associated with the personal data access device and in communication with the program, wherein the first RF transceiver is controlled by the program;

a public, pay-type telephone, electrically connected for communication over the PSTN;

a second RF transceiver associated with the telephone, the second RF transceiver configured for communication, via an RF link, with the first RF transceiver; and a controller associated with the telephone, responsive to communications received from the first RF transceiver to seize a phone line, initiate, and establish a data communication link over the PSTN to the remote communication unit designated by the personal data access device, the controller being configured to allow simultaneous voice and data communications over the PSTN, the controller and the program being further configured to maintain two-way communication between the personal data access device and the remote communication unit via the PSTN and the RF link, and the controller being further configured to terminate the data communication link over the PSTN to the remote communication unit designated by the personal data access device, wherein responsive to receiving from the first RF transceiver a termination communication that originated from the program, the controller terminates the data communication link.

2. The system as defined in claim 1, wherein the personal data access device is a device selected from the group consisting of: a desktop computer, a laptop computer, a hand-held computing device, and a palm-corder.

3. The system as defined in claim 1, wherein the telephone further includes a line interface circuit that is configured to simultaneously direct communications between the PSTN and a handset associate with the telephone, and the PSTN and the second RF transceiver.

4. The system as defined in claim 3, further including a circuit to interface the line interface circuit to a telephone handset.

5. The system as defined in claim 3, wherein the telephone includes a digital subscriber line (DSL) modem for communicating data between the PSTN and the second RF transceiver.

6. The system as defined in claim 3, wherein the telephone includes an integrated services digital network (ISDN) communication device for communicating data between the PSTN and the second RF transceiver.

7. The system as defined in claim 1, wherein the personal data access device includes a modem.

8. A system for communicating with a remote communication unit via a public switched telephone network (PSTN), comprising:

a personal data access device having a first radio frequency (RF) transceiver;

a communication device for communication over the PSTN;

a second RF transceiver associated with the communication device, the second RF transceiver configured for communication with the first RF transceiver via an RF link; and a controller associated with the communication device, responsive to communications received from the first RF transceiver to seize a phone line, initiate, establish, and maintain two-way communication between the personal data access device and the remote communication unit via the PSTN and the RF link, the controller being configured to allow simultaneous voice and data communications over the PSTN and being configured to terminate the communication between the personal data access device and the remote communication unit, wherein responsive to receiving from the first RF transceiver a termination message, the controller terminates the communication between the personal data access device and the remote communication unit.

9. A method for a communication device to establish a communication link between a remote communication unit that is in direct electrical communication with a public switched telephone network (PSTN) and a personal data access device that is electrically remote from the PSTN, the method comprising the steps of:

receiving a request to establish a connection with the remote communication unit, the request being sent via electromagnetic waves from the nearby personal data access device;

establishing a data communication link via the PSTN between the communication device and the remote communication unit, wherein the communication device is configured to allow simultaneous voice and data communications over the PSTN;

relaying communications from the remote communication unit to the communication device along to the personal data access unit, via electromagnetic waves;

relaying communications from the personal data access unit to the communication device along to the remote communication unit;

receiving from the personal data access unit a termination message; and responsive to receiving the termination message, terminating the data communication link between the communication device and the remote communication unit.

10. A device, electrically connected for communication with a public switched telephone network (PSTN), for facilitating communications between a personal data access device and a remote communication unit disposed in communication with the PSTN, the device comprising:

a radio frequency (RF) transceiver configured for communication with a remote RF transceiver associated with the personal data access device, via an RF link; and a controller, responsive to communications received from the remote RF transceiver to maintain two-way communication between the personal data access device and the remote communication unit via the PSTN and the RF link, the controller being configured to allow simultaneous voice and data communications over the PSTN and configured to disconnect communication between the personal data access device and the remote communication unit, wherein responsive to receiving from the remote RF transceiver a termination message, the controller terminates the communication between the personal data access device and the remote communication unit.

11. The device as defined in claim 10, wherein the controller includes a CPU and memory configured to execute program instructions.

12. The device as defined in claim 10, wherein the controller further includes program code configured to control the operation of the device.

13. The device as defined in claim 12, wherein the program code includes:

a first segment configured to control communications across the PSTN between the device and the remote communication unit; and a second segment configured to control communications across the RF link between the device and the personal access device.

\* \* \* \* \*